(12) United States Patent
Arima et al.

(10) Patent No.: US 8,133,945 B2
(45) Date of Patent: Mar. 13, 2012

(54) DEFOAMING AGENT FOR WATER BASED PAINT

(75) Inventors: Tomoko Arima, Soka (JP); Takashi Horiguchi, Washimiya-machi (JP); Shigehiro Kawahito, Soka (JP)

(73) Assignee: Kusumoto Chemicals, Ltd., Tokyo (JP)

( * ) Notice: Subject to any disclaimer, the term of this patent is extended or adjusted under 35 U.S.C. 154(b) by 203 days.

(21) Appl. No.: 12/382,657

(22) Filed: Mar. 20, 2009

(65) Prior Publication Data

US 2010/0076142 A1 Mar. 25, 2010

(30) Foreign Application Priority Data

Sep. 24, 2008 (JP) .................................. 2008-243995

(51) Int. Cl.
*C08G 18/77* (2006.01)
*C09D 1/00* (2006.01)
*C09D 5/02* (2006.01)

(52) U.S. Cl. .......... 524/115; 524/90; 524/612; 524/310; 524/394; 524/62; 560/182; 560/186; 560/189; 252/364

(58) Field of Classification Search ............... 524/115, 524/90, 612, 310, 394, 62; 560/182, 186, 560/189; 252/364
See application file for complete search history.

(56) References Cited

U.S. PATENT DOCUMENTS

| 4,746,739 | A | * | 5/1988 | Yeats et al. ................. 544/222 |
| 5,431,853 | A | | 7/1995 | Tsuda et al. |
| 5,767,053 | A | | 6/1998 | Germain et al. |
| 5,994,415 | A | | 11/1999 | Grüing et al. |
| 2003/0196568 | A1 | * | 10/2003 | Miyamoto et al. ......... 106/31.58 |
| 2009/0036615 | A1 | * | 2/2009 | Miyadai et al. .............. 525/477 |

FOREIGN PATENT DOCUMENTS

| JP | 6-39207 | 2/1994 |
| JP | 8-239690 | 9/1996 |
| JP | 9-117608 | 5/1997 |
| JP | 9-117609 | 5/1997 |
| JP | 10-286404 | 10/1998 |
| JP | 10-323505 | 12/1998 |
| JP | 11-244609 | 9/1999 |
| JP | 2000-300907 | 10/2000 |
| JP | 2003-170005 | 6/2003 |
| JP | 2003-265904 | 9/2003 |
| JP | 2005-13894 | 1/2005 |
| JP | 2005-169271 | 6/2005 |
| JP | 2005-270890 | 10/2005 |
| JP | 2005-279565 | 10/2005 |
| JP | 2006-68678 | 3/2006 |
| JP | 2006-87966 | 4/2006 |
| JP | 2006-95506 | 4/2006 |
| JP | 2006-305461 | 11/2006 |
| JP | 2006-320837 | 11/2006 |
| JP | 2007-21316 | 2/2007 |

OTHER PUBLICATIONS

*Water-based Paint and Coating Technology*, Technical Information Institute Co., Ltd. (Apr. 11, 1992), pp. 167-181 (with partial English translation).

* cited by examiner

*Primary Examiner* — James J Seidleck
*Assistant Examiner* — Deve E Valdez
(74) *Attorney, Agent, or Firm* — Wenderoth, Lind & Ponack, L.L.P.

(57) ABSTRACT

A defoaming agent which can effectively eliminate foams generated in the occasions of preparation, coating, drying and baking of water-based paint, by addition thereof by itself, without combined use of other kind(s) of defoaming agent(s), and furthermore without impairing appearance of baked coated film of the paint or recoatability of the paint is provided. Such a defoaming agent for water-based paint has the composition comprising (1) polyoxyethylene hydrogenated castor oil triisostearates and (2) polyalkyl vinyl ether, polybutadiene, polybutene or polyisoprene, which are dissolved in (3) liquid normal paraffin, liquid isoparaffin or liquid cycloparaffin, at such a ratio that the blended amount of (1) occupies 2-90% by weight of the total composition.

7 Claims, No Drawings

DEFOAMING AGENT FOR WATER BASED PAINT

This invention relates to a defoaming agent which is to be added to water-based paint, for controlling foams generated during preparation or coating of water-based paint.

A large number of defoaming agents for water-based paint are known (cf. Non-patent Reference 1), which can be classified as (1) oil type formed by dispersing antifoam component in mineral oil or the like (cf. Patent Reference 1), (2) hydrophobic surfactant type (cf. Patent References 2-7), (3) emulsion type formed by emulsifying defoamer component (higher alcohol, ester, silicone oil or the like) in water (cf. Patent References 8-12), (4) oil compound type formed by blending defoamer component (higher alcohol, ester, silicone oil or the like) with fine powder such as silica powder (cf. Patent References 13-19), and (5) self-emulsifying type (cf. Patent Reference 20).

[Non-patent Reference 1] Water-based Paint and Coating Technology, Technical Information Institute Co., Ltd. (1992) pp. 167-181
- [Patent Reference 1] JP 2006-87966A
- [Patent Reference 2] JP Hei 9(1997)-117608A
- [Patent Reference 3] JP Hei 9(1997)-117609A
- [Patent Reference 4] JP Hei 11(1999)-244609A
- [Patent Reference 5] JP 2000-300907A
- [Patent Reference 6] JP 2003-265904A
- [Patent Reference 7] JP 2006-068678A
- [Patent Reference 8] JP Hei 6(1994)-39207A (corresponding to U.S. Pat. No. 5,431,853)
- [Patent Reference 9] JP 2005-13894A
- [Patent Reference 10] JP 2005-169271A
- [Patent Reference 11] JP 2006-95506A
- [Patent Reference 12] JP 2006-305461A
- [Patent Reference 13] JP Hei 8(1996)-239690A (corresponding to U.S. Pat. No. 5,767,053 and EP0718018)
- [Patent Reference 14] JP Hei 10(1998)-286404A
- [Patent Reference 15] JP Hei 10(1998)-323505A (corresponding to U.S. Pat. No. 5,994,415 and EP0878224)
- [Patent Reference 16] JP 2003-170005A
- [Patent Reference 17] JP 2005-270890A
- [Patent Reference 18] JP 2005-279565A
- [Patent Reference 19] JP 2006-320837A
- [Patent Reference 20] JP 2007-21316A As to these five types of defoaming agents, the oil type agents are generally said to excel in foam-bursting property; the hydrophobic surfactant type, in form-suppressing property; the emulsion type, in deaeration property; the oil compound type agents are said to be universally effective, water-based paint and oil paint alike; and the self-emulsifying type is generally said to excel in durability of defoaming effect.

With these known defoaming agents, however, it is frequently observed that attempts to defoam with any of the type alone fail to accomplish satisfactory result. In such occasions, it is necessary to concurrently use different type(s) of defoaming agent(s), which causes the problem of quantitative increase of defoaming agent to be added. Also in the field wherein high quality finish is required such as automobile coating which is under study in recent years, use of oil compound type defoaming agent is apt to be avoided, because such solid component as silica powder or the like contained therein tends to impair overcoatability or appearance of finished coating film.

In view of the foregoing defects of known defoaming agents for water-based paint, the object of the present invention is to provide a defoaming agent for water-based paint, which exhibits sufficient defoaming effect upon addition of only a minor amount of single kind of the defoaming agent to water-based paint, without impairing high quality coated appearance.

According to the present invention, as the defoaming agent for water-based paint fulfilling the above object, a defoaming agent for water-based paint characterized by comprising (1) polyoxyethylene hydrogenated castor oil triisostearates represented by the general formula (A)

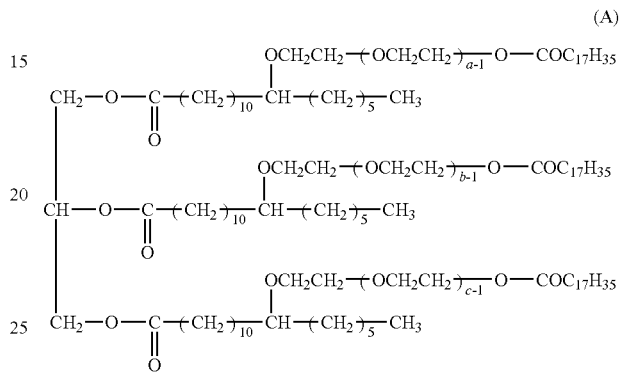

[in the formula, $a+b+c=$ an integer of 5-50, $a>1$, $b>1$ and $c>1$] and (2) one, two or more of polymers selected from polyalkyl vinyl ether, polybutadiene, polybutene and polyisoprene, which are dissolved in (3) a solvent or a mixture of two or more kinds of solvents selected from liquid normal paraffin, liquid isoparaffin and liquid cycloparaffin, the blended amount of the polyoxyethylene hydrogenated castor oil triisostearates (i.e., ethoxylated castor oil, hydrogenated, triisostearates) being 2-90% by weight based on the weight of the defoaming agent for water-based paint is provided.

One of preferred embodiments of the defoaming agent according to the invention comprises 2-90% by weight of the compound represented by the above general formula (A) and 2-90% by weight of polyalkyl vinyl ether having the recurring structural units represented by the general formula (B)

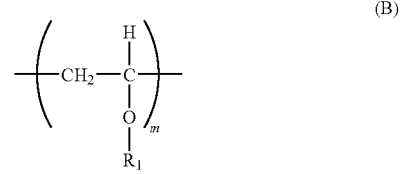

[in the formula, $R_1$ stands for $C_{1-18}$ alkyl group, and m is an integer of 10-500], which are dissolved in a solvent or a mixture of two or more kinds of solvents selected from liquid normal paraffin, liquid isoparaffin and liquid cycloparaffin.

Another preferred embodiment of the defoaming agent according to the invention comprises 2-90% by weight of the compound represented by the above general formula (A) and 2-90% by weight of a polybutadiene having the recurring structural units represented by the general formula (C)

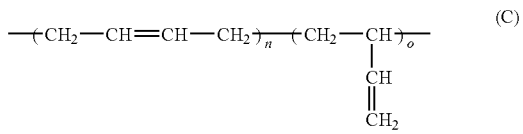

(C)

[in the formula, n+o is an integer of 10-500, n≧0 and o≧0], hydrogenated polybutadiene, carboxy-terminated polybutadiene or hydroxy-terminated polybutadiene, which are dissolved in a solvent or a mixture of two or more kinds of solvents selected from liquid normal paraffin, liquid isoparaffin and liquid cycloparaffin.

Still another preferred embodiment of the defoaming agent according to the invention comprises 2-90% by weight of the compound represented by the above formula (A) and 2-90% by weight of polybutene having the recurring structural units represented by the general formula (D)

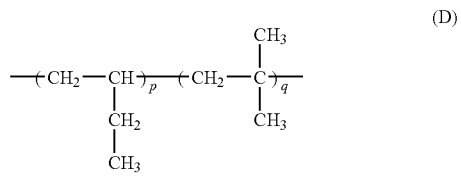

(D)

[in the formula, p+q is an integer of 10-500, p>1, and q≧0] or hydrogenated polybutene, which are dissolved in a solvent or a mixture of two or more kinds of solvents selected from liquid normal paraffin, liquid isoparaffin and liquid cycloparaffin.

A still further preferred embodiment of the defoaming agent according to the invention comprises 2-90% by weight of the compound represented by the above general-formula (A) and 2-90% by weight of polyisoprene having the recurring structural units represented by the formula (E)

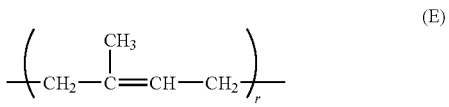

(E)

[in the formula, r is an integer of 10-500], hydrogenated polyisoprene or hydroxy-terminated polyisoprene, which are dissolved in a solvent or a mixture of two or more kinds of solvents selected from liquid normal paraffin, liquid isoparaffin and liquid cycloparaffin.

The defoaming agent comprising a compound of the general formula (A) and a water-insoluble polymer of the general formula (B), (C), (D), (E) or a modification thereof as above, as dissolved in liquid normal paraffine, liquid isoparaffin or liquid cycloparaffin as above can effectively control the foams generated during preparation of water-based paint as well as coating, drying and baking of the same paint, by the use of the agent alone, without combined use with other defoaming agent(s). Because the defoaming agent of the present invention contains the compound of the general formula (A), it enables such water-insoluble polymers as those of the general formula (B), (C), (D) and (E) to be uniformly dispersed in water-based paint, whereby preventing such coating defects as cissing or cratering, the defects which are apt to be caused by use of such water-insoluble polymers as defoaming agents. Furthermore, because the defoaming agent of this invention does not impair appearance of baked coating film or recoatability, it is useful also for the paint to which high quality finish is required like automobile paint.

Hereinafter the best mode for working the present invention is explained.

The polyoxyethylene hydrogenated castor oil triisostearates used in the present invention are the component essential for the agent to exhibit stable defoaming performance. The total mol number of oxyethylene contained in the general formula (A), (a+b+c), is 5-50, and it is necessary that a>1, b>1 and c>1. Such a compound in which any one of a, b and c is 1 or less has a structure to which no polyoxyethylene is added and therefore cannot be used in the present invention. Where the mol number (a+b+c) is less than 5, there arises the problem that the compound separates from the paint to cause cissing. On the other hand, when the mol number (a+b+c) of the oxyethylene is more than 50, sufficient defoaming property cannot be given. The polyoxyethylene hydrogenated castor oil triisostearates can be produced by triesterification between the polyoxyethylene hydrogenated castor oil and isostearic acid, and is commercially available in a number of types, examples of which include EMALEX RWIS-305 (5 mol), EMALEX RWIS-310 (10 mol), EMALEX RWIS-315 (15 mol), EMALEX RWIS-320 (20 mol), EMALEX RWIS-330 (30 mol), EMALEX RWIS-340 (40 mol) and EMALEX RWIS-350 (50 mol) (all made by Nihon Emulsion Co., Ltd.). In the above, (5 mol), (10 mol), (15 mol), (20 mol), (30 mol), (40 mol) and (50 mol) added after the tradenames indicate the respective mol number of oxyethylene added in the products.

The blended amount of the polyoxyethylene hydrogenated castor oil triisostearates is preferably 2-90 wt %, in particular, 5-40 wt %. Where it is less than 2 wt %, dispersion of the water-insuluble polymer(s) or the solvent becomes incomplete and sufficient defoaming ability cannot be exhibited. Furthermore, the agent is liable to cause defects in the resultant coated film. Where more than 90 wt % is blended, the amount of other components becomes too little to enable the agent to exhibit its defoaming performance.

The polyalkyl vinyl ether of the general formula (B), which is used in the present invention, can be obtained through polymerization or copolymerization of vinyl ether monomer(s) having $C_{1-18}$ alkyl. Examples of $C_{1-18}$ vinyl ether monomer include methyl vinyl ether, ethyl vinyl ether, n-propyl vinyl ether, i-propyl vinyl ether, n-butyl vinyl ether, i-butyl vinyl ether, tert-butyl vinyl ether, hexyl vinyl ether, n-octyl vinyl ether, 2-ethylhexyl vinyl ether, i-nonyl vinyl ether, dodecyl vinyl ether, tetradecyl vinyl ether, hexadecyl vinyl ether, octadecyl vinyl ether and the like. Preferred polyalkyl vinyl ethers are those obtained by polymerization or copolymerization of one, two or more of above monomers by cation polymerization method, which have the degree of polymerization of 10-500 (corresponding to number-average molecular weight of 1,000-150,000). Where the degree of polymerization is less than 10, sufficient defoaming performance cannot be exhibited. Whereas, when the degree of polymerization exceeds 500, it becomes difficult for the polymer or copolymer to be uniformly dispersed in the paint, which induces such problems as cissing or cratering.

The blended amount of the polyalkyl vinyl ether is preferably 2-90 wt %, in particular, 5-40 wt %. With the blended amount of less than 2 wt %, sufficient defoaming performance cannot be exhibited. When more than 90 wt % is blended, on the other hand, the other components become too little to exhibit defoaming performance.

The polybutadiene of the general formula (C) which is used in the present invention is a homopolymer or copolymer of 1,3-butadiene ($CH_2$=CH—CH=$CH_2$) or 1,2-butadiene ($CH_2$=C=CH—$CH_3$). Various types of such polybutadiene are commercially available, preferred examples of which include, as the homopolymers, B-1000 (pentadeca-pentacosamers: number-average molecular weight, about 1,000), B-2000 (triaconta-tetracontamers: number-average molecular weight, about 2,000), B-3000 (pentatetraconta-pentahexacontamers: number-average molecular weight, about 3,000); as the hydrogenated type, BI-2000 (triaconta-tetracontamers: number-average molecular weight, about 2000), BI-3000 (pentatetraconta-pentahexacontamers: number-average molecular weight, about 3000); as terminal carboxylic acid group type, C-1000 (eicosa-triacontamers: number-average molecular weight, about 1400); and as terminal hydroxyl group type, G-1000 (eicosa-triacontamers; number-average molecular weight, about 1500), G-2000 (triaconta-tetracontamers: number-average molecular weight, about 2000), G-3000 (pentatetraconta-hexacontamers: number-average molecular weight, about 2900) [all made by Nippon Soda Co., Ltd.]; Poly bd R-15HT (eicosa-pentacosamers: number-average molecular weight, about 1200), Poly bd R-45HT (pentatetraconta-pentapenta-contamers: number-average molecular weight, about 2800) [made by Idemitsu Kosan Co., Ltd] and the like.

Preferred degree of polymerization of the polybutadiene is 10-500 (corresponding to number-average molecular weight of 500-22,000). Where the degree of polymerization is less than 10, sufficient defoaming performance cannot be exhibited. Whereas, when the degree of polymerization exceeds 500, it becomes difficult for the polymer or copolymer to be uniformly dispersed in the paint, which induces such problems as cissing, cratering, and fogging of the coating film.

The blended amount of the polybutadine is preferably 2-90 wt %, in particular, 5-40 wt %. With the blended amount of less than 2 wt %, sufficient defoaming performance cannot be exhibited. When more than 90 wt % is blended, on the other hand, the other components become too little to exhibit defoaming performance.

As the polybutene of the general formula (D) to be used in the present invention, homopolymers of 1-butene or copolymers of 1-butene and isobutene can be used, or those available on the market can be utilized. Examples of preferred commercial products of 1-butene/isobutene copolymer include HV-15 (ennea-tridecamers: number-average molecular weight, about 630), HV-35 (deca-pentadecamers: number-average molecular weight, about 750), HV-50 (dodeca-hexadecamers: number-average molecular weight, about 800), HV-100 (hexadeca-eicosamers; number-average molecular weight, about 980), HV-300 (tricosa-heptacosamers: number-average molecular weight, about 1400) and HV-1900 (pentatetraconta-pentapentacontamers: number-average molecular weight, about 2900) [all made by Nippon Oil Corporation] and the like. As examples of 1-butene homopolymer, 15R (ennea-undecamers: number-average molecular weight, about 570), 35R (dodeca-tetradecamers: number-average molecular weight, about 720), 100R (hexadeca-eicosamers: number-average molecular weight, about 960), 300R (tetracosa-triacontamers: number-average molecular weight, about 1500); and as hydrogenated type, 300H (tetracosa-triacontamers: number-average molecular weight, about 1500), 2000H (pentaconta-pentapentacontamers: number-average molecular weight, about 3000) [made by Idemitsu Kosan Co., Ltd.] and the like can be named.

Preferred degree of polymerization of the polybutene is 10-500 (corresponding to number-average molecular weight of 500-22,000). Those having the degree of polymerization of less than 10 are included by later described isoparaffin type solvent. Whereas, when the degree of polymerization exceeds 500, it becomes difficult for the polymer or copolymer to be uniformly dispersed in the paint, which induces such problems as cissing, cratering, and fogging of the coating film.

The blended amount of polybutene is preferably 2-90 wt %, in particular, 5-40 wt %. Where the blended amount is less than 2 wt %, sufficient defoaming performance cannot be exhibited. When more than 90 wt % is blended, on the other hand, the other components become two little to exhibit defoaming performance.

As the polyisoprene of the general formula (E) to be used in the present invention, those available on the market can be used. Examples of the commercially available polymer include Poly iP (triaconta-tetracontamers: number-average molecular weight, about 2500) which is of terminal hydroxyl group type, EPOL which is the hydrogenated type of Poly iP [both made by Idemitsu Kosan Co., Ltd.] and the like.

Preferred degree of polymerization of the polyisoprene is 10-500 (corresponding to number-average molecular weight of 700-35,000). Where the degree of polymerization is less than 10, sufficient defoaming performance cannot be exhibited. Whereas, when the degree of polymerization exceeds 500, it becomes difficult for the polymer to be uniformly dispersed in the paint, which induces such problems as cissing, cratering, and fogging of the coating film.

The blended amount of the polyisoprene is preferably 2-90 wt %, in particular, 5-40 wt %. With the blended amount of less than 2 wt %, sufficient defoaming performance cannot be exhibited. When more than 90 wt % is blended, on the other hand, the other components become too little to exhibit defoaming performance.

Examples of liquid normal paraffin used in the present invention include normal hexane, normal heptane, normal octane, normal decane, normal dodecane, liquid paraffin and commonly marketed normal paraffin-containing mixed solvent (e.g., No. 0 SOLVENT L made by Nippon Oil Corporation).

Examples of liquid isoparaffin used in the present invention include isohexane, isooctane, isododecane, isohexadecane, low molecular weight polybutene LV-7 (tetra-hexamers: number-average molecular weight, about 300), LV-50 (hexaenneamers: number-average molecular weight, about 450), LV-100 (octa-dodecamers: number-average molecular weight, about 500) [all made by Nippon Oil Corporation]; hydrogenated type polybutene OH (octa-heptamers: number-average molecular weight, about 350), 5H (hexa-octamers: number-average molecular weight about, 400), 10H-T (hepta-decamers: number-average molecular weight, about 470) [all made by Idemitsu Kosan Co., Ltd.]; and commonly marketed isoparaffin-containing mixed solvents (e.g., IP SOLVENT of Idemitsu Kosan Co., Ltd., SHELLSOL T Series of Shell Chemicals Co., Ltd., ISOPER Series of Exxon Chemicals K.K.) and the like.

Examples of the liquid cycloparaffin used in the present invention include commercially available naphthenic solvents, such as Methyl Cyclohexane, Ethyl Cyclohexane, SWACLEAN 150 (another name: a mixture of $C_9$ and $C_{10}$ alkyl cyclohexanes) [all made by Maruzen Petrochemical Co., Ltd.], Naphtesol Series and Cactus Solvent Series [all made by Nippon Oil Corporation] and the like.

It is also possible to use mixed solvents on the market which contain liquid normal paraffin, liquid isoparaffin and liquid cycloparaffin, in the present invention. Examples of such commercial solvent include Naphtesol M (naphthene/isoparaffin/-normal paraffin=at least 70%/5-10%/not more than 15%; tradename, Nippon Oil Corporation), Isosol 300 and Isosol 400 (tradenames, Nippon Oil Corporation), Exxsol D80, Exxsol D110, Exxsol D130 and Exxsol D160 (paraffin/ cycloparaffin mixed solvents, tradenames, ExxonMobil Chemical Company) and the like.

The paint suitable for addition of the defoaming agent of the present invention includes water-based paint to which high quality finish is required, for example, water-based base paint for automobiles, water-based intermediate paint for automobiles, water-based primer paint for automobiles, water-based paint for high-class household furniture and the like. When the defoaming agent of the present invention is added to such paints, excellent defoaming effect is accomplished at the time of their preparation, coating operation and baking, and occurrence of drop in production efficiency of the water-based paints or coating defect such as popping can be prevented.

The time to add the defoaming agent of the invention to water-based paint is optional. It can be done at the stage of kneading pigment or even after formulation of the paint.

The addition ratio of the defoaming agent of the invention to water-based paint differs depending on the kinds of resins in the object paint, blending composition of pigment and the like, while normally it is 0.01-10 wt %, preferably 0.05-5 wt %, to the paint vehicle as converted to the solid content. When it is less than 0.01 wt %, the agent cannot exhibit sufficient defoaming property. Whereas, when more than 10 wt % is added, it may invite such adverse effects as poor interlayer adherability in recoating of the paint, unevenness in top coating film, or decrease in water resistance of the coating film after baking.

Hereinafter the present invention is explained more specifically in further details, referring to Examples, it being understood that the invention is not limited to these Examples.

In the following, "part" and "%" are respectively "weight part" and "weight %".

PRODUCTION EXAMPLE 1

A 1000 mL-reactor equipped with an agitation device, reflux condenser, dropping funnel, thermometer and nitrogen gas inlet port was charged with 150 parts of toluene and 3 parts of 10% diethyl ether dilution of boron fluoride-diethyl ether complex which is a cation polymerization initiator. The temperature in the reactor was raised to 30° C. while introducing nitrogen gas thereinto, and thereafter the following dropping solution (a-1) was dropped thereinto at a constant rate through the dropping funnel, over 2 hours.
Dropping Solution (a-1)

| Ethyl vinyl ether | 300 parts |
| Toluene | 100 parts |

Thirty (30) minutes after completion of dropping of the solution (a-1), 15 parts of ethyl alcohol was added to stop the reaction. After the end of the reaction, the solvent was removed with an evaporator to provide alkyl vinyl ether polymer [A-1]. Thus synthesized polymer had a number-average molecular weight as converted to polystyrene on its gel permeation chromatograph of 3000, which corresponds to 30 in degree of polymerization.

PRODUCTION EXAMPLE 2

A 1000 mL-reactor equipped with an agitation device, reflux condenser, dropping funnel, thermometer and nitrogen gas inlet port was charged with 150 parts of toluene and 1.5 parts of 10% diethyl ether dilution of boron fluoride-diethyl ether complex. The temperature in the reactor was raised to 40° C. while introducing nitrogen gas thereinto, and thereafter the following dropping solution (a-2) was dropped thereinto at a constant rate through the dropping funnel, over 2 hours. Then alkyl vinyl ether polymer [A-2] was obtained by the method similar to Production Example 1.
Dropping Solution (a-2)

| Ethyl vinyl ether | 150 parts |
| 2-Ethylhexyl vinyl ether | 150 parts |
| Toluene | 100 parts |

The number-average molecular weight of the synthesized copolymer, as converted to polystyrene on its gel permeation chromatograph, was 4500 which corresponds to 35 in degree of polymerization.

PRODUCTION EXAMPLE 3

By the method similar to Production Example 2 except that the dropping solution (a-2) used in Production Example 2 was replaced with the following dropping solution (a-3), alkyl vinyl ether polymer [A-3] was obtained.
Dropping Solution (a-3)

| Butyl vinyl ether | 100 parts |
| Dodecyl vinyl ether | 200 parts |
| Toluene | 100 parts |

The number-average molecular weight of the synthesized copolymer, as converted to polystyrene on its gel permeation chromatograph, was 5000 which corresponds to 30 in degree of polymerization.

PRODUCTION EXAMPLE 4

A 1000 mL-reactor equipped with an agitation device, reflux condenser, dropping funnel, thermometer and nitrogen gas inlet port was charged with 150 parts of toluene and 0.6 part of 10% diethyl ether dilution of boron fluoride-diethyl ether complex. The temperature in the reactor was raised to 40° C. while introducing nitrogen gas thereinto, and thereafter the following dropping solution (a-4) was dropped thereinto at a constant rate through the dropping funnel, over 2 hours. Then alkyl vinyl ether polymer [A-4] was obtained by the method similar to Production Example 1.
Dropping Solution (a-4)

| Dodecyl vinyl ether | 150 parts |
| Hexadecyl vinyl ether | 150 parts |
| Toluene | 100 parts |

The number-average molecular weight of the synthesized copolymer, as converted to polystyrene on its gel permeation chromatograph, was 10500 which corresponds to 45 in degree of polymerization.

PRODUCTION EXAMPLE 5

A 1000 mL-reactor equipped with an agitation device, reflux condenser, dropping funnel, thermometer and nitrogen gas inlet port was charged with 150 parts of toluene and 0.3 part of 10% diethyl ether dilution of boron fluoride-diethyl ether complex. The temperature in the reactor was cooled to 15° C. while introducing nitrogen gas thereinto, and thereafter the following dropping solution (a-5) was dropped thereinto at a constant rate through the dropping funnel, over 2 hours. Then alkyl vinyl ether polymer [A-5] was obtained by the method similar to Production Example 1.
Dropping Solution (a-5)

| | |
|---|---|
| Dodecyl vinyl ether | 150 parts |
| Octadecyl vinyl ether | 150 parts |
| Toluene | 100 parts |

The number-average molecular weight of the synthesized copolymer, as converted to polystyrene on its gel permeation chromatograph, was 120000 which corresponds to 480 in degree of polymerization.

PRODUCTION EXAMPLE 6

A 1000 mL-reactor equipped with an agitation device, reflux condenser, dropping funnel, thermometer and nitrogen gas inlet port was charged with 150 parts of toluene and 0.6 part of 10% diethyl ether dilution of boron fluoride-diethyl ether complex. The temperature in the reactor was cooled to 20° C. while introducing nitrogen gas thereinto, and thereafter the following dropping solution (a-6) was dropped thereinto at a constant rate through the dropping funnel, over 2 hours. Then alkyl vinyl ether polymer [A-6] was obtained by the method similar to Production Example 1.
Dropping Solution (a-6)

| | |
|---|---|
| Hexadecyl vinyl ether | 150 parts |
| Octadecyl vinyl ether | 150 parts |
| Toluene | 100 parts |

The number-average molecular weight of the synthesized copolymer, as converted to polystyrene on its gel permeation chromatograph, was 62000 which corresponds to 220 in degree of polymerization.

COMPARATIVE PRODUCTION EXAMPLE 1

A 1000 mL-reactor equipped with an agitation device, reflux condenser, dropping funnel, thermometer and nitrogen gas inlet port was charged with 150 parts of toluene and 0.6 part of 10% diethyl ether dilution of boron fluoride-diethyl ether complex. The temperature in the reactor was cooled to 20° C. while introducing nitrogen gas thereinto, and thereafter the following dropping solution (n-1) was dropped thereinto at a constant rate through the dropping funnel, over 2 hours. Then alkyl vinyl ether polymer [N-1] was obtained by the method similar to Production Example 1.
Dropping Solution (n-1)

| | |
|---|---|
| Ethyl vinyl ether | 100 parts |
| Isobutyl vinyl ether | 200 parts |
| Toluene | 100 parts |

The number-average molecular weight of the synthesized copolymer, as converted to polystyrene on its gel permeation chromatograph, was 95000 which corresponds to 810 in degree of polymerization.

COMPARATIVE PRODUCTION EXAMPLE 2

A 1000 mL-reactor equipped with an agitation device, reflux condenser, dropping funnel and nitrogen gas inlet part was charged with 150 parts of toluene and 6 parts of 10% diethyl ether-dilution of boron fluoride-diethyl ether complex. The temperature in the reactor was raised to 50° C. while introducing nitrogen gas thereinto, and thereafter the following dropping solution (n-2) was dropped thereinto at a constant rate, over 2 hours. Then alkyl vinyl ether polymer [N-2] was obtained by the method similar to Production Example 1.
Dropping Solution (n-2)

| | |
|---|---|
| Dodecyl vinyl ether | 150 parts |
| Octadecyl vinyl ether | 150 parts |
| Toluene | 100 parts |

The number-average molecular weight of the synthesized copolymer, as converted to polystyrene on its gel permeation chromatograph, was 1500 which corresponds to 6 in degree of polymerization.

TABLE 1

Polymers of Production Examples

| | Sample Name | Number-average Molecular Weight | Degree of Polymerization |
|---|---|---|---|
| Production Example 1 | A-1 | 3000 | 30 |
| Production Example 2 | A-2 | 4500 | 35 |
| Production Example 3 | A-3 | 5000 | 30 |
| Production Example 4 | A-4 | 10500 | 45 |
| Production Example 5 | A-5 | 120000 | 480 |
| Production Example 6 | A-6 | 62000 | 220 |

TABLE 2

Polymers of Comparative Production Examples

| | Sample Name | Number-average Molecular Weight | Degree of Polymerization |
|---|---|---|---|
| Comparative Production Example 1 | N-1 | 95000 | 810 |
| Comparative Production Example 2 | N-2 | 1500 | 6 |

BLENDING EXAMPLES 1-6

Examples in Which the Added mol Number of Oxyethylene in Polyoxyethylene Hydrogenated Castor Oil Triisostearates was Varied As the compositions for use in Paint Test Examples, the compositions having the blend ratios as shown in Table 3 were prepared.

TABLE 3

| Blending Example | Example 1 | Example 2 | Example 3 | Example 4 | Example 5 | Example 6 |
|---|---|---|---|---|---|---|
| EMALEX RWIS-305 (*1) | 15 | — | — | — | — | — |
| EMALEX RWIS-310 (*2) | — | 15 | — | — | — | — |
| EMALEX RWIS-315 (*3) | — | — | 15 | — | — | — |
| EMALEX RWIS-320 (*4) | — | — | — | 15 | — | — |
| EMALEX RWIS-330 (*5) | — | — | — | — | 15 | — |
| EMALEX RWIS-340 (*6) | — | — | — | — | — | 15 |
| Alkyl vinyl ether polymer [A-1] | 15 | 15 | 15 | 15 | 15 | 15 |
| Liquid paraffin No. 30 *7) | 15 | 15 | 15 | 15 | 15 | 15 |
| Isododecane | 55 | 55 | 55 | 55 | 55 | 55 |

(*1) Polyoxyethylene hydrogenated castor oil triisostearate in which the added mol number of the oxyethylene was 5
(*2) Polyoxyethylene hydrogenated castor oil triisostearate in which the added mol number of the oxyethylene was 10
(*3) Polyoxyethylene hydrogenated castor oil triisostearate in which the added mol number of the oxyethylene was 15
(*4) Polyoxyethylene hydrogenated castor oil triisostearate in which the added mol number of the oxyethylene was 20
(*5) Polyoxyethylene hydrogenated castor oil triisostearate in which the added mol number of the oxyethylene was 30
(*6) Polyoxyethylene hydrogenated castor oil triisostearate in which the added mol number of the oxyethylene was 40 [All made by Nihon Emulsion Co., Ltd.]
*7) A combination of normal paraffins made by Sanko Chemical Industries Co., Ltd.

BLENDING EXAMPLES 7-12

Examples in Which Blended Amount of Polyoxyethylene Hydrogenated Castor Oil Triisostearates was Varied As the compositions for use in Paint Test Examples, the compositions having the blend ratios as shown in Table 4 were prepared.

TABLE 4

| Blending Example | Example 7 | Example 8 | Example 9 | Example 10 | Example 11 | Example 12 |
|---|---|---|---|---|---|---|
| EMALEX RWIS-320 | 5 | 10 | 20 | 40 | 60 | 80 |
| Alkyl vinyl ether polymer [A-1] | 15 | 15 | 15 | 15 | 5 | 5 |
| Liquid paraffin No. 30 | 25 | 20 | 10 | — | — | — |
| Isododecane | 55 | 55 | 55 | 45 | 35 | 15 |

BLENDING EXAMPLES 13-17

Examples in Which the Kind of Alkyl Vinyl Ether Polymer Blended was Varied

As the compositions for use in Paint Test Examples, the compositions having the blend ratios as shown in Table 5 were prepared.

TABLE 5

| Blending Example | Example 13 | Example 14 | Example 15 | Example 16 | Example 17 |
|---|---|---|---|---|---|
| EMALEX RWIS-320 | 15 | 15 | 15 | 15 | 15 |
| Alkyl vinyl ether polymer [A-2] | 15 | — | — | — | — |
| Alkyl vinyl ether polymer [A-3] | — | 15 | — | — | — |
| Alkyl vinyl ether polymer [A-4] | — | — | 15 | — | — |
| Alkyl vinyl ether polymer [A-5] | — | — | — | 15 | — |
| Alkyl vinyl ether polymer [A-6] | — | — | — | — | 15 |
| Liquid paraffin No. 30 | 15 | 15 | 15 | 15 | 15 |
| Isododecane | 55 | 55 | 55 | 55 | 55 |

BLENDING EXAMPLES 18-22

Examples in Which Polybutadiene, Polybutene or Polyisoprene was Blended

As the compositions for use in Paint Test Examples, the compositions having the blend ratios as shown in Table 6 were prepared.

TABLE 6

| Blending Example | Example 18 | Example 19 | Example 20 | Example 21 | Example 22 |
|---|---|---|---|---|---|
| EMALEX RWIS-320 | 15 | 15 | 15 | 15 | 15 |
| Polybutadiene [B-3000] *1) | 15 | — | — | — | — |
| Polybutadiene [R-45T] *2) | — | 15 | — | — | — |
| Polybutene [300R] *3) | — | — | 15 | — | — |
| Polybutene [2000H] *4) | — | — | — | 15 | — |

TABLE 6-continued

| Blending Example | Example 18 | Example 19 | Example 20 | Example 21 | Example 22 |
|---|---|---|---|---|---|
| Polyisoprene [Poly iP] *5) | — | — | — | — | 15 |
| Liquid paraffin No. 30 | 15 | 15 | 15 | 15 | 15 |
| Isododecane | 55 | 55 | 55 | 55 | 55 |

*1) made by Nippon Soda Co., Ltd.
*2) Idemitsu Kosan Co.,, Ltd.
*3) Idemitsu Kosan Co.,, Ltd.
*4) Idemitsu Kosan Co.,, Ltd.
*5) Idemitsu Kosan Co.,, Ltd.

BLENDING EXAMPLES 23-28

Examples in Which the Kind of Paraffin Solvent was Varied

As the compositions for use in Paint Test Examples, the compositions having the blend ratios as shown in Table 7 were prepared.

TABLE 7

| Blending Example | Example 23 | Example 24 | Example 25 | Example 26 | Example 27 | Example 28 |
|---|---|---|---|---|---|---|
| EMALEX RWIS-320 | 15 | 15 | 15 | 15 | 15 | 15 |
| Alkyl vinyl ether polymer [A-1] | 10 | 10 | 10 | 10 | 10 | 10 |
| Polyisoprene [Poly iP] | 10 | 10 | 10 | 10 | 10 | 10 |
| Liquid paraffin No. 30 | — | 10 | 15 | 10 | 10 | 10 |
| Liquid paraffin No. 70 *7) | 10 | — | — | — | — | — |
| Isododecane | — | — | 35 | — | 25 | — |
| Normal dodecane | — | — | — | 55 | — | — |
| SHELLSOL TK *1) | 55 | — | — | — | — | 25 |
| Polybutene [OH] *2) | — | 10 | — | — | — | — |
| Ethylcyclohexane *3) | — | — | 15 | — | — | — |
| IP SOLVENT 1620 *4) | — | 45 | — | — | — | — |
| No. 0 SOLVENT L *5) | — | — | — | — | 30 | — |
| Exxsol D80 *6) | — | — | — | — | — | 30 |

*1) Shell Chemicals Japan, Ltd.
*2) Idemitsu Kosan Co., Ltd.
*3) Maruzen Petrochemical Co., Ltd.
*4) Idemitsu Kosan Co., Ltd.
*5) Nippon Oil Corporation
*6) ExxonMobil Chemical Company
*7) Sanko Chemical Industries Co., Ltd.

COMPARATIVE BLENDING EXAMPLES 1-6

Examples Using the Compounds in Which Polyoxyethylene Hydrogenated Castor Oil Triisostearates used had Added mol Number of Oxyethylene Outside the Scope of the Present Invention, or the Compounds Having the Chemical Structures not Corresponding to the General Formula (A)

As the compositions for use in Paint Test Examples, the compositions having the blend ratios as shown in Table 8 were prepared.

TABLE 8

| Comparative Blending Example | Comparative Example 1 | Comparative Example 2 | Comparative Example 3 | Comparative Example 4 | Comparative Example 5 | Comparative Example 6 |
|---|---|---|---|---|---|---|
| EMALEX RWIS-303 (*1) | 15 | — | — | — | — | — |
| EMALEX RWIS-360 (*2) | — | 15 | — | — | — | — |
| EMALEX RWIS-120 (*3) | — | — | 15 | — | — | — |
| EMALEX RWIS-220 (*4) | — | — | — | 15 | — | — |
| EMALEX RWL-120 (*5) | — | — | — | — | 15 | — |
| EMALEX GWIS-320 (*6) | — | — | — | — | — | 15 |

TABLE 8-continued

| Comparative Blending Example | Comparative Example 1 | Comparative Example 2 | Comparative Example 3 | Comparative Example 4 | Comparative Example 5 | Comparative Example 6 |
|---|---|---|---|---|---|---|
| Alkyl vinyl ether polymer [A-1] | 15 | 15 | 15 | 15 | 15 | 15 |
| Liquid paraffin No. 30 | 15 | 15 | 15 | 15 | 15 | 15 |
| Isododecane | 55 | 55 | 55 | 55 | 55 | 55 |

(*1) polyoxyethylene hydrogenated castor oil triisostearate in which the added mol number of the oxyethylene was 3
(*2) polyoxyethylene hydrogenated castor oil triisostearate in which the added mol number of the oxyethylene was 60
(*3) polyoxyethylene hydrogenated castor oil monoisostearate in which the added mol number of the oxyethylene was 20
(*4) polyoxyethylene hydrogenated castor oil diisostearate in which the added mol number of the oxyethylene was 20
(*5) polyoxyethylene hydrogenated castor oil monolaurate in which the added mol number of the oxyethylene was 20
(*6) polyoxyethylene glyceryl triisostearate in which the added mol number of the oxyethylene was 20 All made by Nihon Emulsion Co., Ltd.

COMPARATIVE BLENDING EXAMPLES 7-12

Examples of Compositions in Which No Polyoxyethylene Hydrogenated Castor Oil Triisostearate was Blended and an Example in Which None of Polyalkyl Vinyl Ether, Polybutadiene, Polybutene and Polyisoprene was Blended As the compositions for use in Paint Test Examples, the compositions having the blend ratios as shown in Table 9 were prepared.

TABLE 9

| Comparative Blending Example | Comparative Example 7 | Comparative Example 8 | Comparative Example 9 | Comparative Example 10 | Comparative Example 11 | Comparative Example 12 |
|---|---|---|---|---|---|---|
| EMALEX RWIS-320 | 15 | — | — | — | — | — |
| Alkyl vinyl ether polymer [A-1] | — | 15 | — | — | — | — |
| Polybutadiene [B-3000] | — | — | 15 | — | — | — |
| Polybutadiene [R-45T] | — | — | — | 15 | — | — |
| Polybutene [300R] | — | — | — | — | 15 | — |
| Polyisoprene [Poly iP] | — | — | — | — | — | 15 |
| Liquid paraffin No. 30 | 30 | 30 | 30 | 30 | 30 | 30 |
| Isododecane | 55 | 55 | 55 | 55 | 55 | 55 |

COMPARATIVE BLENDING EXAMPLES 13-14

Examples of the Compositions in Which Polyalkyl Vinyl Ethers Having the Degree of Polymerization Outside the Scope of the Invention were Blended As the compositions for use in Paint Test Examples, the compositions having the blend ratios as shown in Table 10 were prepared.

TABLE 10

| Comparative Blending Example | Comparative Example 13 | Comparative Example 14 |
|---|---|---|
| EMALEX RWIS-320 | 15 | 15 |
| Alkyl vinyl ether polymer [N-1] | 15 | — |
| Alkyl vinyl ether polymer [N-2] | — | 15 |
| Liquid paraffin No. 30 | 15 | 15 |
| Isododecane | 55 | 55 |

Paint Test Example (Defoaming Test with Water-Based Acrylic Melamine Paint)

Defoaming activity test was carried out with the water-based acrylic melamine paint composition formed of a mixture of the Blend A and Blend B as specified in Table 11.

[Formulation of Water-Based Acrylic Melamine Paint]

The blend A was uniformly dispersed with a desk sand mill (made by Kansai Paint Co. Ltd.) to form a milled base, with which the blend B was mixed under agitation with a laboratory dispersing device to formulate a water-based acrylic melamine paint. The resulting paint was adjusted with 2-dimethylaminoethanol to have a pH7.8, and diluted with distilled water to have a viscosity of 35 seconds/Ford cup #4/20° C.

[Defoaming Activity Test in Can: Test and Evaluation of Defoaming Activity During Formulation of Paint]

To the above water-based acrylic melamine paint, each 2 wt % thereto of the defoaming agents as specified in Tables 3-10 were added, and stirred with a laboratory dispersing device at 4000 rpm for 3 minutes to be foamed.

After 1 minute and 5 minutes of the end of the agitation, specific gravity of each of the water-based paint samples in which the foams were caught up was measured with a 1000 mL specific gravity cup (made by Taiyu Kizai K.K.). The higher the specific gravity, the higher the effect of breaking the foams caught up in the paint.

[Defoaming Activity Test at the Coating Time and Baking Time]

The formulated water-based acrylic melamine paint samples were left standing for 24 hours, and then each was air sprayed onto a 200 mm×300 mm tin plate by wedge coating to provide baked coating film thickness from 30 µm to 100 µm. After 3 minutes' setting at room temperature, the coated tin plate samples were dried for 3 minutes in a 80° C. oven, followed by 20 minutes' baking in a 150° C. oven.

[Evaluation of Defoaming Activity at the Coating and Baking Time]

The evaluation of defoaming activity was given by visual examination of occurrence of popping and cissing, each of which was rated in 5 grades from "best" (5) to "worst" (1). Also the minimum film thickness at which popping started to occur was measured with an electromagnetic coating thickness tester (LE-200J: made by Kett Electric Laboratory).

The results were as shown in Tables 12 and 13.

The "popping" as referred to herein signifies the foams which are formed in baked coating film and can be confirmed with visual observation in the form of bubbles at the coated film surface. Also "cissing" refers to crater-like depositions or holes allowing direct perception of substrate therethrough, which are formed on the coated film surface after baking.

TABLE 11

Water-based Acrylic Melamine Paint Composition

| Starting material | Amount (part) | Maker | Remarks |
|---|---|---|---|
| Blend A | | | |
| Setalux 6100 GR-74 | 73.7 | Nuplex Industries Limited | acrylic emulsion resin |
| 2-butoxyethanol | 22.4 | Kyoei Yozai K.K. | film-forming assistant |
| 2-dimethylaminomethanol | 1.5 | Tokyo Chemical Industry Co., Ltd. | Neutralizer |
| distilled water | 140.0 | | Diluent |
| titanium oxide JR-600A | 160.2 | Tayca Corporation | Pigment |
| Blend B | | | |
| Setalux 6100 GR-74 | 229.5 | Nuplex Industries Limited | acrylic emulsion resin |
| 2-butoxyethanol | 22.4 | Kyoei Yozai K.K. | film-forming assistant |
| propylene glycol | 22.4 | Kanto Chemical Co., Ltd. | anti-freezing agent |
| Setamine MS-152 AQ-70 | 137.3 | Nuplex Industries Limited | melamine resin |
| 2-dimethylaminoethanol | 2.7 | Tokyo Chemical Industry Co., Ltd. | Neutralizer |
| distilled water | 167.5 | | Diluent |

TABLE 12

Test Results of Defoaming Agents of Blending Examples 1-28, in Water-based Acrylic Melamine Paint

| Blending Example No. | In-can Defoaming Activity (specific gravity) after 1 minute | In-can Defoaming Activity (specific gravity) after 5 minutes | popping evaluation | film thickness at which popping occurred (μm) | Occurrence of Cissing (number) |
|---|---|---|---|---|---|
| BLANK | 0.65 | 0.69 | 1 | 30 | 0 |
| 1 | 0.82 | 0.86 | 3 | 50 | 0 |
| 2 | 0.92 | 0.94 | 3 | 55 | 0 |
| 3 | 0.92 | 0.93 | 4 | 55 | 0 |
| 4 | 0.96 | 0.97 | 5 | 80 | 0 |
| 5 | 0.94 | 0.96 | 5 | 80 | 0 |
| 6 | 0.88 | 0.92 | 3 | 45 | 0 |
| 7 | 0.94 | 0.95 | 4 | 60 | 0 |
| 8 | 0.94 | 0.96 | 5 | 80 | 0 |
| 9 | 0.94 | 0.96 | 5 | 80 | 0 |
| 10 | 0.91 | 0.93 | 4 | 60 | 0 |
| 11 | 0.89 | 0.93 | 4 | 60 | 0 |
| 12 | 0.84 | 0.88 | 3 | 50 | 0 |
| 13 | 0.96 | 0.97 | 5 | 80 | 0 |
| 14 | 0.96 | 0.97 | 5 | 80 | 0 |
| 15 | 0.97 | 0.97 | 5 | 85 | 0 |
| 16 | 0.88 | 0.91 | 3 | 55 | 0 |
| 17 | 0.90 | 0.92 | 3 | 60 | 0 |
| 18 | 0.89 | 0.92 | 4 | 55 | 0 |
| 19 | 0.83 | 0.86 | 3 | 55 | 0 |
| 20 | 0.89 | 0.91 | 3 | 55 | 0 |
| 21 | 0.83 | 0.85 | 3 | 55 | 0 |
| 22 | 0.89 | 0.91 | 4 | 65 | 0 |
| 23 | 0.92 | 0.94 | 5 | 80 | 0 |
| 24 | 0.90 | 0.92 | 5 | 80 | 0 |
| 25 | 0.91 | 0.93 | 5 | 80 | 0 |
| 26 | 0.95 | 0.96 | 5 | 80 | 0 |
| 27 | 0.95 | 0.97 | 5 | 80 | 0 |
| 28 | 0.95 | 0.96 | 5 | 80 | 0 |

TABLE 13

Test Results of Defoaming Agents of Comparative Blending Examples 1-14, in Water-based Acrylic Melamine Paint

| Comparative Blending Example No. | In-can Defoaming Activity (specific gravity) after 1 minute | In-can Defoaming Activity (specific gravity) after 5 minutes | popping evaluation | film thickness at which popping occurred (μm) | Occurrence of Cissing (number) |
|---|---|---|---|---|---|
| BLANK | 0.65 | 0.69 | 1 | 30 | 0 |
| 1 | 0.82 | 0.84 | 1 | 30 | countless |
| 2 | 0.72 | 0.74 | 1 | 30 | 0 |
| 3 | 0.69 | 0.69 | 1 | 30 | 0 |
| 4 | 0.73 | 0.76 | 1 | 30 | 0 |
| 5 | 0.69 | 0.71 | 1 | 30 | 0 |
| 6 | 0.55 | 0.56 | 1 | 30 | 0 |
| 7 | 0.94 | 0.95 | 1 | 30 | 0 |
| 8 | 0.83 | 0.86 | 3 | 30 | 8 |
| 9 | 0.76 | 0.76 | 2 | 30 | 3 |
| 10 | 0.76 | 0.77 | 2 | 30 | 7 |
| 11 | 0.79 | 0.80 | 2 | 30 | 6 |
| 12 | 0.76 | 0.78 | 2 | 30 | 2 |
| 13 | 0.93 | 0.94 | 3 | 40 | countless |
| 14 | 0.91 | 0.94 | 2 | 30 | 0 |

The invention claimed is:

1. A defoaming agent for water-based paint, comprising:
(1) a polyoxyethylene hydrogenated castor oil triisostearate represented by the formula (A)

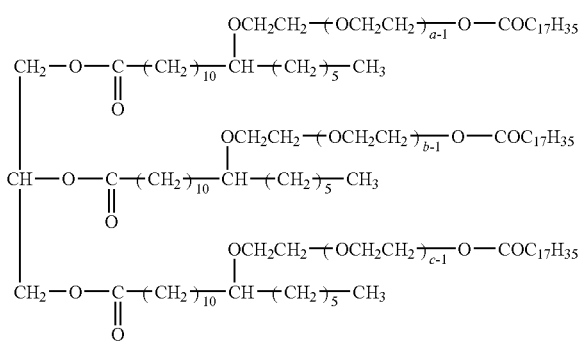

(A)

wherein, in the formula (A), a+b+c=an integer of 5 -50, a>1, b>1 and c>1, and
(2) a polyalkyl vinyl ether, which is dissolved in
(3) a liquid isoparaffin,
wherein the blended amount of the polyoxyethylene hydrogenated castor oil triisostearate is 2-90% by weight based on the weight of the defoaming agent for water-based paint.

2. The defoaming agent according to claim 1, which comprises 2-90% by weight of the compound represented by the formula (A) and 2- 90% by weight of a polyalkyl vinyl ether having a recurring structural unit represented by formula (B)

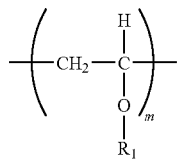

(B)

wherein, in the formula (B), $R_1$ stands for a $C_{1-18}$ alkyl group, and m is an integer of 10-500, which is dissolved in a liquid isoparaffin.

3. A defoaming agent for water-based paint, comprising:
(1) a polyoxyethylene hydrogenated castor oil triisostearate represented by the formula (A)

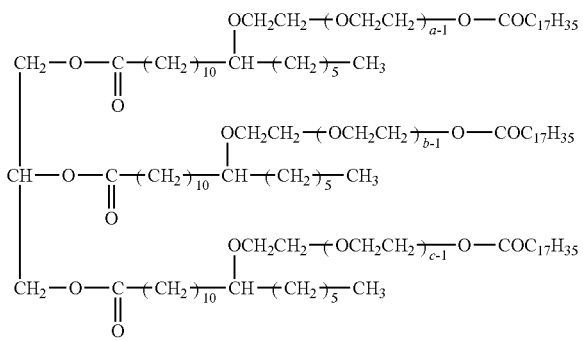

(A)

wherein, in the formula (A), a+b+c=an integer of 5 - 50, a>1, b>1 and c>1, and
(2) a polyalkyl vinyl ether, which is dissolved in
(3) a liquid alkane, wherein the blended amount of the polyoxyethylene hydrogenated castor oil triisostearate is 2- 90% by weight based on the weight of the defoaming agent for water-based paint.

4. The defoaming agent according to claim 3, which comprises 2-90% by weight of the compound represented by the formula (A) and 2- 90% by weight of a polyalkyl vinyl ether having a recurring structural unit represented by formula (B)

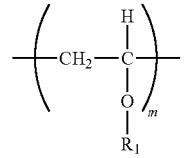

(B)

wherein, in the formula (B), $R_1$ stands for a $C_{1-18}$ alkyl group, and m is an integer of 10-500, which is dissolved in a liquid alkane.

5. The defoaming agent according to claim 3, wherein the liquid alkane is selected from the group consisting of liquid normal paraffin, liquid isoparaffin and liquid cycloparaffin.

6. The defoaming agent according to claim 4, wherein the liquid alkane is selected from the group consisting of liquid normal paraffin, liquid isoparaffin and liquid cycloparaffin.

7. A defoaming agent for water-based paint, comprising:
(1) a polyoxyethylene hydrogenated castor oil triisostearate represented by formula (A)

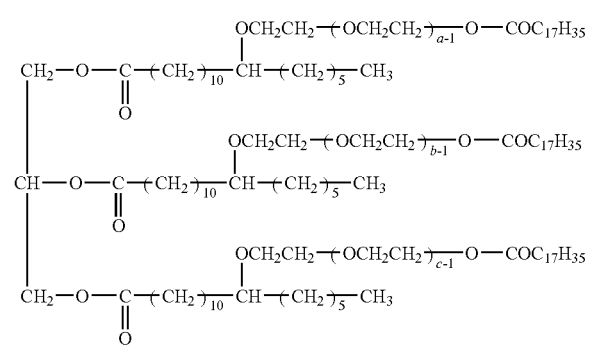

(A)

wherein, in the formula (A), a+b+c=an integer of 5 - 50, a>1, b>1 and c>1, and
(2) a polyalkyl vinyl ether having a recurring structural unit represented by formula (B)

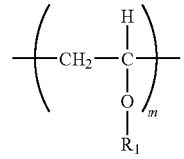

(B)

wherein, in the formula (B) , $R_1$ stands for a $C_{1-18}$ alkyl group, and m is an integer of 10-500,
which are dissolved in
(3) a solvent or a mixture of two or more solvents selected from the group consisting of liquid normal paraffin, liquid isoparaffin and liquid cycloparaffin,
wherein the defoaming agent comprises 2-90% by weight of the compound represented by the formula (A) and 2-90% by weight of the polyvinyl ether.

* * * * *